3,217,480
LAWN EDGER
Francis Lowell Orr, 1049 11th Ave., Sacramento, Calif.
Filed Sept. 14, 1964, Ser. No. 396,048
6 Claims. (Cl. 56—256)

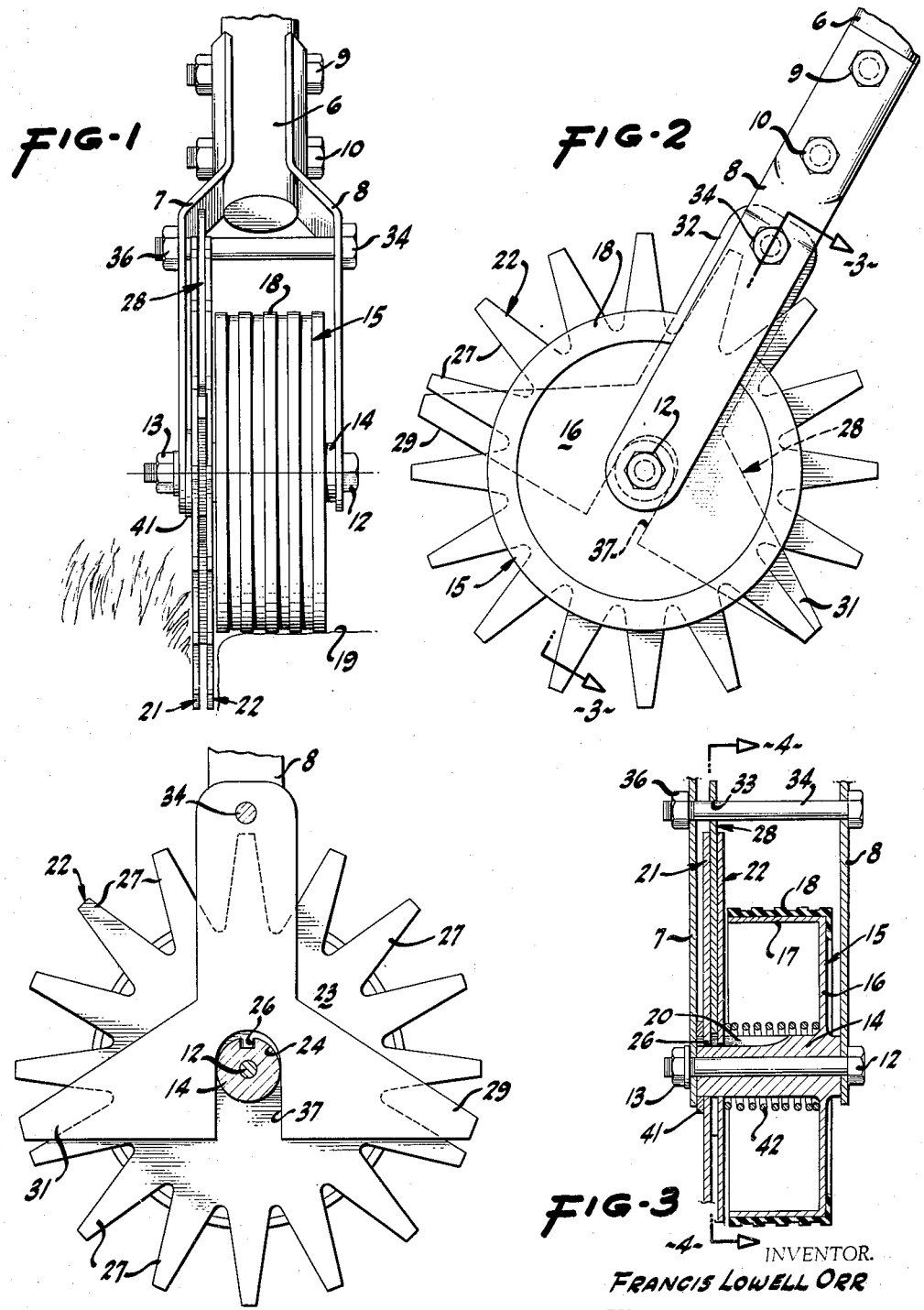

My invention relates to hand operated devices useful in trimming the otherwise ragged edge of a lawn or similar growth and is for the same general purpose as the lawn edger disclosed in my Patent 2,746,229 issued May 22, 1956.

While lawn edgers have come into relatively wide use, they do not always operate as effectively as might be desired in that some blades of grass are merely brushed by the edger and are not appropriately severed.

Also, during the operation of the lawn edger sometimes the cutting instrumentalities become clogged with debris and cut material which inhibit or prevent the further operation of the device, at least in a satisfactory manner.

It is therefore an object of the invention to provide a lawn edger that is a substantial improvement over lawn edgers previously utilized.

Another object of the invention is to provide a lawn edger which has automatically effective means to prevent clogging of the lawn edger during use.

Another object of the invention is to provide a lawn edger which will act effectively in either forward or rearward direction of operation.

Another object of the invention is to provide a lawn edger which in general has the same appearance and mode of operation as lawn edgers presently popular so that no new techniques of operation must be learned.

A still further object of the invention is to provide a lawn edger which can simply and economically be manufactured and which will require little if any repairs or maintenance during normal use.

Other objects of the invention together with the foregoing are attained in the embodiment of the invention described in the accompanying description and illustrated in the accompanying drawings, in which:

FIGURE 1 is a front elevation of a lawn edger constructed in accordance with the invention, the edger being shown in a position of use;

FIGURE 2 is a side elevation of the structure of FIGURE 1;

FIGURE 3 is a cross section, the plane of which is indicated by the line 3—3 of FIGURE 2, certain portions being broken away to reduce the size of the figure; and FIGURE 4 is a cross section, the plane of which is indicated by the line 4—4 of FIGURE 3.

While the lawn edger pursuant to the invention can readily be embodied in a number of different forms, it has practically found success in the particular form disclosed herein. In this embodiment there is provided a handle 6 which extends to any suitable point for ready grasping and manipulation by a user. The handle 6 forms part of a main frame, other parts of which are comprised by a side arm 7 and a side arm 8, together constituting a yoke frame at the lower end of the handle 6 and being secured thereto by a pair of through fasteners 9 and 10 illustrated as bolts but which can also be rivets or the like.

At the lower ends of the side arms 7 and 8 a bolt 12 is disposed. This bolt is a standard item and is secured at one end by a nut 13. Mounted to rotate on the bolt 12 is a hub 14 constituting a portion of a ground-engaging wheel generally designated 15. The wheel includes a radial web 16 at or near one end of the hub 14 and also includes a rim 17 which is shod with a solid rubber, grooved tire 18 designed to contact a walkway 19 or the like in use of the implement.

The hub 14 is generally circular cylindrical throughout most of its length, except that it is provided with an axially extending keyway 20. Encompassing the hub 14 is a pair of edger wheels 21 and 22. These wheels are substantially identical. Each of them is a metal disc having a central portion 23 pierced by a central aperture 24 that is circular except for a key 26 designed to extend into the keyway 20 and to be slidably received therein. The periphery of each of the edger wheels is serrated to afford a number of sharpened teeth 27. Since the edger wheels are substantially identical, their integral keys 26, both engaging the same keyway 20, maintain the saw-like teeth or cutter teeth 27 in substantial axial registry. With this mounting, the edger wheels must necessarily rotate with the hub 14 when the ground-engaging tire 18 is rotated relative to the side arms 7 and 8.

Pursuant to the invention, a cutter blade 28 is disposed between the individual edger wheels 21 and 22. This blade 28 is a generally planar member having a pair of radial arms 29 and 31 of approximately the same extent as the teeth 27 and designed to be sharpened in order to cooperate with the teeth. A third arm 32 on the cutter blade extends radially and is provided with a suitable opening 33 adapted loosely to engage a through bolt 34. This is a standard item and is disposed parallel to the axle bolt 12 and spans the side arms 7 and 8, being secured in position by means of a nut 36. Centrally, the cutter blade 28 loosely embraces the hub 14 since there is a U-shaped cutout 37 therein arranged symmetrically between the radial arms 29 and 31. With this mounting, the cutter blade is free to move axially since the aperture 33 is a free fit on the bolt 34, but the cutter blade is held nonrotatably relative to the yoke frames 7 and 8.

Also in accordance with the invention, a thrust washer 41 surrounds the hub 14 and is disposed against the yoke arm 7 and against the next adjacent edger wheel 21. A helical spring 42 surrounds the hub 14 and at one end bears against the radial wheel web 16 and at the other end bears against the other edger wheel 22.

With this assembly, a user operates the handle 6 at a comfortable inclination and urges the ground-engaging tire 18 along the support 19 with the assembled cutter and wheel structures positioned near the edge of the grass. Advancement of the device causes rotation of the ground-engaging tire 18 and simultaneous rotation of the hub 14 and both of the edger wheels 21 and 22. The cutter 28 remains stationary, so that blades of grass entrained between the teeth 27 of both the wheels are doubly urged into shearing contact from both sides of the blade 28 and are not brushed aside nor do they escape without cutting. Preferably the edger wheels 21 and 22 are made slightly concave so that when the teeth 27 of the edger wheels wipe over the radial arms 29 and 31 a shearing effect occurs. The arms 29 and 31 are made of somewhat softer metal than the edger wheels so there is a sharpening action on the cutter blade 28. The arm 32 of the cutter blade is sharpened along both edges so that the concave teeth of the edger wheels will engage and pass over the arm 32 with only a small resistance. The relationship of the parts is such that the edger wheels and the cutter blade, or any one of them, can be easily removed and replaced.

The effective interrelationship of the pair of edger wheels and the cutter is maintained by the force of the spring 42. This keeps these parts in substantial frictional contact so that material does not lodge between them. During the rotation of these members, any debris which might be entrained between the wheels is dislodged either upon encountering the stationary leg 32 of the blade or upon encountering whichever one of the legs 29 and 31 is not being utilized, depending upon the direction of advance.

What is claimed is:

1. A lawn edger comprising a yoke frame, an axle spanning said yoke frame, a hub rotatably mounted on said axle, a ground-engaging wheel secured to said hub for unitary rotation, a pair of edger wheels mounted on said hub for axial movement, means for constraining said edger wheels and said hub to rotate in unison, a cutter blade between said edger wheels and embracing said hub, means spanning said yoke frame for supporting said cutter blade, and a spring urging said edger wheels and said cutter blade together.

2. A lawn edger as in claim 1 including a thrust washer disposed against said yoke frame and in which said spring surrounds said hub and urges said edger wheels and said cutter blade toward said thrust washer.

3. A lawn edger comprising a yoke frame, an axle spanning said yoke frame, a bolt spanning said yoke frame parallel to said axle, a hub rotatably mounted on said axle, said axle having an axial keyway therein, a ground-engaging wheel on said axle, said ground-engaging wheel including a radial web, a pair of edger wheels on said hub, keys on said edger wheels slidably received in said keyway, a cutter blade disposed between said edger wheels and engaging said bolt and said hub, a thrust washer on said hub between said yoke frame and one of said edger wheels, and a helical spring surrounding said hub and bearing at one end on said web and at the other end on the other of said edger wheels.

4. A lawn edger as in claim 3 in which said cutter blade includes a pair of radial arms extending on opposite sides of said yoke frame.

5. A lawn edger comprising a yoke frame, a hub rotatably mounted on said yoke frame, a ground-engaging wheel for driving said hub, a pair of edger wheels axially movable on said hub, means for connecting said edger wheels and said hub for rotation in unison, a cutter blade disposed between said pair of edger wheels and axially movable on said hub, means for holding said cutter blade against rotation relative to said yoke frame, and means for yieldingly urging said cutter blade and said edger wheels into close axial engagement.

6. A lawn edger as in claim 5 in which said cutter blade is radially removable from between said edger wheels when said cutter blade holding means is released therefrom.

References Cited by the Examiner
UNITED STATES PATENTS

| | | | |
|---|---|---|---|
| 2,212,057 | 8/1940 | Waller | 56—256 |
| 2,626,499 | 1/1953 | Wick | 56—256 |
| 2,746,229 | 5/1956 | Orr | 56—256 |
| 2,798,355 | 7/1957 | Coulter | 56—256 |

ABRAHAM G. STONE, *Primary Examiner.*

RUSSELL R. KINSEY, *Examiner.*